(12) United States Patent
Koyama et al.

(10) Patent No.: US 7,582,233 B2
(45) Date of Patent: Sep. 1, 2009

(54) METHOD OF MANUFACTURING DIRECTIONAL COUPLER

(75) Inventors: Tomoko Koyama, Hara-mura (JP);
Takeo Kaneko, Misato-mura (JP);
Taketomi Kamikawa, Shiojiri (JP);
Norio Oguchi, Chino (JP); Atsushi Harada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 11/400,246

(22) Filed: Apr. 10, 2006

(65) Prior Publication Data

US 2006/0174657 A1    Aug. 10, 2006

Related U.S. Application Data

(62) Division of application No. 10/286,768, filed on Nov. 4, 2002, now abandoned.

(30) Foreign Application Priority Data

Nov. 21, 2001    (JP) ............... 2001-356161

(51) Int. Cl.
*G02B 6/26* (2006.01)

(52) U.S. Cl. ..................... 264/1.25; 264/1.7

(58) Field of Classification Search ............... None
See application file for complete search history.

(56) References Cited

U.S. PATENT DOCUMENTS

| 4,556,279 | A | 12/1985 | Shaw et al. |
|---|---|---|---|
| 4,669,816 | A | 6/1987 | Thompson |
| 4,792,200 | A | 12/1988 | Amann et al. |
| 4,861,128 | A | 8/1989 | Ishikawa et al. |
| 5,146,518 | A | 9/1992 | Mak et al. |
| 5,166,992 | A | 11/1992 | Cassidy et al. |
| 5,917,980 | A | 6/1999 | Yoshimura et al. |
| 6,317,526 | B1 | 11/2001 | Shirasaki et al. |
| 6,385,376 | B1 | 5/2002 | Bowers et al. |
| 6,627,125 | B1 * | 9/2003 | Nishikawa ............... 264/1.7 |
| 6,703,780 | B2 * | 3/2004 | Shiang et al. ............ 313/504 |
| 7,029,607 | B2 * | 4/2006 | Shimizu et al. .......... 264/1.25 |
| 7,200,313 | B2 * | 4/2007 | Kuroda et al. ............ 385/132 |

FOREIGN PATENT DOCUMENTS

| JP | A 05-224049 | 9/1993 |
|---|---|---|
| JP | A 2000-165116 | 6/2000 |
| JP | A 2000-165117 | 6/2000 |
| JP | A 2002-023205 | 1/2002 |
| JP | A 2002-062446 | 2/2002 |

* cited by examiner

*Primary Examiner*—Mary Lynn F Theisen
(74) *Attorney, Agent, or Firm*—Oliff & Berridge, PLC

(57) ABSTRACT

A method of manufacturing directional coupler includes forming a first waveguide over a substrate, forming a separate section on respective ends of the first waveguide, and forming a second waveguide stacked over the first waveguide, wherein the first waveguide and the second waveguide are patterned by ink-jet process. The first waveguide and the second waveguide may be formed so as to overlap each other. The method may further include forming a projecting portion on the substrate, wherein the first waveguide being formed on the projection portion.

18 Claims, 12 Drawing Sheets

METHOD OF MANUFACTURING DIRECTIONAL COUPLER

Japanese Patent Application No. 2001-356161 filed on Nov. 21, 2001, is hereby incorporated by reference in its entirety. This is a divisional application of U.S. patent application Ser. No. 10/286,768 filed Nov. 4, 2002, which is incorporated by reference in its entirety.

BACKGROUND OF THE INVENTION

The present invention relates to a directional coupler used as an optical component and an optical communication device using the same.

A conventional directional coupler has a structure in which a directional coupler is two-dimensionally formed with respect to a substrate. Therefore, if a plurality of directional couplers is integrated, an area occupied by the directional couplers in a device is increased.

In order to solve this problem, technology for realizing a three-dimensional structure has been proposed as disclosed in Japanese Patent Application Laid-open No. 5-224049, for example.

BRIEF SUMMARY OF THE INVENTION

The present invention may provide a directional coupler which can be integrated in the stacking direction and an optical communication device using the same.

A directional coupler according to the present invention comprises:
 a substrate;
 a first waveguide layer;
 a second waveguide layer disposed over the first waveguide layer;
 a separation layer which separates the first waveguide layer and the second waveguide layer at least at one end; and
 an optical coupling section which is a predetermined region in which the first waveguide layer and the second waveguide layer approach or come in contact with each other,
 wherein each of the first waveguide layer and the second waveguide layer is integrally and continuously formed.

DETAILED DESCRIPTION OF THE EMBODIMENT

Figure 1:
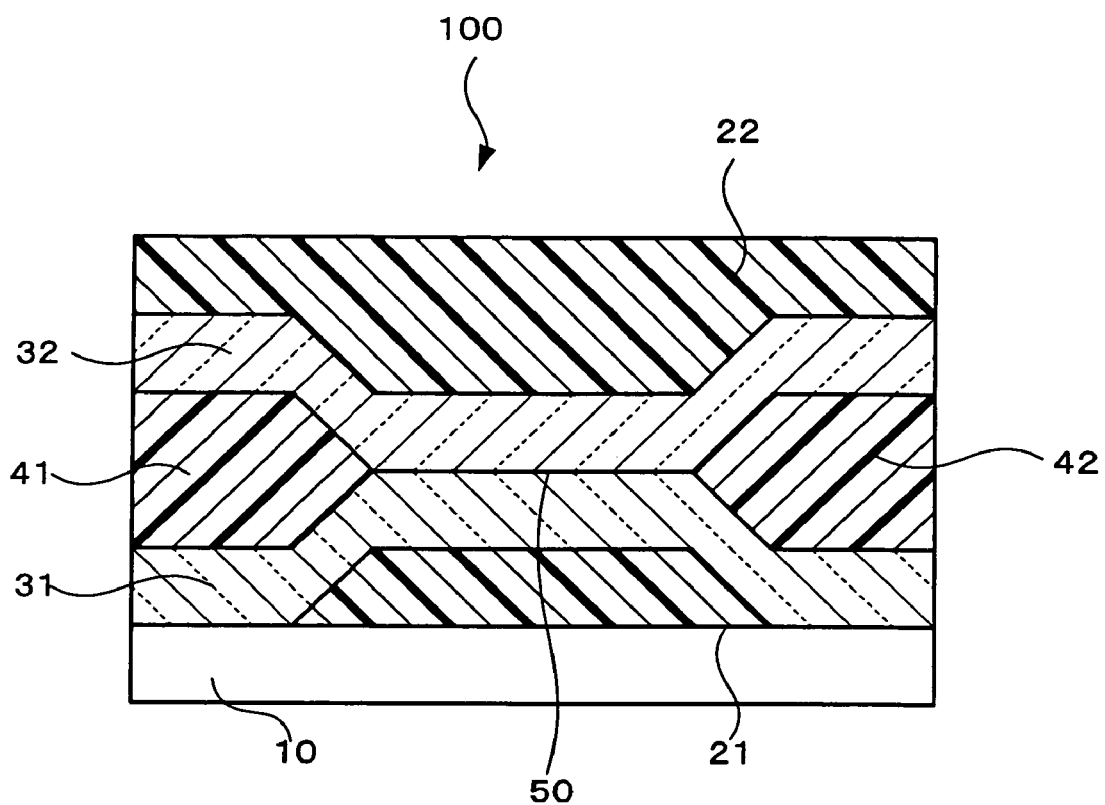
FIG. 1 is a cross-sectional view schematically showing a directional coupler according to a first embodiment of the present invention.

A directional coupler according to an embodiment of the present invention comprises:
 a substrate;
 a first waveguide layer;
 a second waveguide layer disposed over the first waveguide layer;
 a separation layer which separates the first waveguide layer and the second waveguide layer at least at one end; and
 an optical coupling section which is a predetermined region in which the first waveguide layer and the second waveguide layer approach or come in contact with each other,
 wherein each of the first waveguide layer and the second waveguide layer is integrally and continuously formed.

According to the directional coupler of this embodiment of the present invention, the separation layer is formed to separate the first waveguide layer and the second waveguide layer at least at one end. The ends of the waveguide layers become input/output sections of the directional coupler according to the present invention.

Each of the first waveguide layer and the second waveguide layer is integrally and continuously formed. The first and second waveguide layers have the optical coupling section for distributing incident light from one waveguide layer to the other waveguide layer in a predetermined region from the input to the output in which the waveguide layers approach or come in contact with each other.

Therefore, part of light incident from the input end of one of the first waveguide layer and the second waveguide layer is distributed to the other waveguide layer in the optical coupling section. The light is emitted from the output ends of the first and second waveguide layers depending upon the distribution in the optical coupling section.

"Integrally and continuously" used herein means that a bonded interface or the like is not formed in one waveguide layer from the input end to the output end, for example.

According to the directional coupler of this embodiment, since each of the first and second waveguide layers is integrally and continuously formed, loss of light between the input and the output of each of the first and second waveguide layers can be decreased. Since the waveguide layers are disposed in the stacking direction, an area of the substrate occupied by the waveguide layers can be decreased. According to this embodiment, a directional coupler having a novel structure which enables integration in the stacking direction can be realized.

The directional coupler of this embodiment may have the following features.

(1) The directional coupler according to this embodiment may comprise:

a first cladding layer which is disposed over the substrate and has a projecting portion on the substrate; and a second cladding layer disposed over the second waveguide layer, wherein part of the first waveguide layer may be disposed over the projecting portion of the first cladding layer to form the optical coupling section.

According to this configuration, since the first cladding layer has the projecting portion, the first waveguide layer is provided with a bent portion by disposing the first waveguide layer over the projecting portion. The second waveguide layer is disposed on the first waveguide layer, whereby the optical coupling section is formed near the bent portion.

Since the first and second waveguide layers function as cores, and the separation layer and the first and second cladding layers function as clads, a low-loss directional coupler which utilizes total reflection of light can be realized.

(2) The first waveguide layer or the second waveguide layer may be disposed linearly.

According to this configuration, since the step of forming the waveguide layer can be simplified, the number of manufacturing steps can be decreased. Moreover, the number of manufacturing steps can be further decreased by linearly disposing the first waveguide layer. For example, it is unnecessary to provide the first cladding layer by forming the bent portion to the first waveguide layer.

The second waveguide layer may be formed with a bent portion by using the separation layer, for example. Thus, the optical coupling section may be formed between the first waveguide layer and the second waveguide layer.

(3) The separation layer may include:

a first separation layer which separates the first waveguide layer and the second waveguide layer at one end; and a second separation layer which separates the first waveguide layer and the second waveguide layer at the other end.

The first separation layer and the second separation layer may be disposed between the first waveguide layer and the second waveguide layer and integrally and continuously formed with each other.

According to this configuration, light distributed in the optical coupling section passes through part of the separation layer. Therefore, an area in which the first separation layer and the second separation layer are connected can function as part of the optical coupling section.

Refractive indices of the first cladding layer and the second cladding layer may be the same, and refractive indices of the first and second separation layers may differ from refractive indices of the first and second cladding layers. This enables a directional coupler having a desired distribution to be easily realized by changing the refractive indices of the separation layers.

(4) The directional coupler according to this embodiment may further comprise an electrode layer, and distribution of light in the optical coupling section may be changeable by applying a predetermined voltage to the electrode layer.

According to this configuration, an electro-optic effect occurs in the optical coupling section by the voltages applied to the electrode layers. The electro-optic effect causes the difference in the refractive index between the waveguides or the phase difference of light in the optical coupling section to be changed. This configuration may be applied to an optical switching element or an optical modulator which utilizes the electro-optic effect.

In this directional coupler, the electrode layer may comprise an electrode pair including a first electrode layer disposed under the first waveguide layer in the optical coupling section and a second electrode layer disposed over the second waveguide layer in the optical coupling section. In this configuration, distribution of light in the optical coupling section may be changeable by applying different voltages to the first and second electrode layers, respectively.

For example, the electrode pair may includes: a first electrode pair having the first and second electrode layers; and a second electrode pair having the first and second electrode layers. A voltage applied to the first electrode layer may be higher than a voltage applied to the second electrode layer in the first electrode pair, and a voltage applied to the second electrode layer may be higher than a voltage applied to the first electrode layer in the second electrode pair. This improves controllability of the distribution in the optical coupling section.

(5) The directional coupler according to this embodiment may comprise a heating section, and distribution of light in the optical coupling section may be changeable by heating the optical coupling section by a heating section.

This configuration may be applied to an optical switching element or an optical modulator which utilizes a thermo-optic effect in the optical coupling section. The thermo-optic effect causes the difference in the refractive index between the waveguides in the optical coupling section to be changed due to heat produced by current flowing through an electrothermal layer or the like provided near the optical coupling section.

(6) A directional coupler according to another embodiment of the present invention is formed by stacking a plurality of the above directional couplers.

Since the plurality of directional couplers can be stacked, directional couplers having different distributions can be easily integrated in the stacking direction.

(7) A directional coupler according to a further embodiment of the present invention is applied to an optical communication device including the above directional coupler.

As application examples of the optical communication device, an optical communication device in which the directional coupler, a light-emitting device, driver circuits therefor, and the like are integrated, an optical communication device further including an optical switch, and the like can be given.

In the directional coupler according to this embodiment, a material for each layer may be selected from conventional materials used for thin-film optical waveguides, quartz optical fibers, plastic optical fibers, and the like. As the materials used for thin-film optical waveguides, silicon oxide ($SiO_2$), lithium niobate (LiNbO$_3$), and the like can be given. As the materials used for quartz optical fibers, oxide glass represented by silicon oxide, heavy metal fluoride glass (ZrF$_4$—BaF$_2$), chalcogenide glass (As—S, As—Ge—Se, Ge—S), and the like can be given. As the materials used for plastic optical fibers, polymethylmethacrylate (PMMA), epoxy resin, phenol resin, diallylphthalate, phenyl methacrylate, fluorine-containing polymer, and the like can be given.

Each layer of the directional coupler according to the present invention is formed by using a film formation method suitable for the material. For example, conventional technique such as a vapor deposition method, spin coating method, LB method, or ink-jet method may be used.

Embodiments of the present invention are described below with reference to the drawings.

First Embodiment

1. Structure of Device

FIG. 1 is a cross-sectional view schematically showing an example of a directional coupler 100 according to a first embodiment of the present invention.

In the directional coupler 100, a first cladding layer 21, a first waveguide layer 31, a first separation layer 41, a second separation layer 42, a second waveguide layer 32, and a second cladding layer 22 are stacked on a substrate 10.

The first waveguide layer 31 has a bent portion. The bent portion is formed by stacking the first waveguide layer 31 on the first cladding layer 21 having a section which projects on the substrate 10 (projecting portion). The second waveguide layer 32 also has a bent portion. The bent portion is formed by stacking the second waveguide layer 32 on the first separation layer 41 and the second separation layer 42. In the directional coupler 100, an optical coupling section 50 is formed in a region in which the waveguide layer 31 is in contact with the waveguide layer 32.

Therefore, according to the directional coupler 100, a novel structure in which the waveguide layers 31 and 32 are disposed in the stacking direction can be realized. Moreover, an area of the substrate occupied by the waveguide layers 31 and 32 can be decreased by disposing the waveguide layers 31 and 32 in the stacking direction. Furthermore, integration in the stacking direction can be achieved by disposing the waveguide layers 31 and 32 in the stacking direction.

2. Function of Device

The functions of the directional coupler 100 according to the present embodiment are described below. In the following description, light is input to the left end of the first waveguide layer 31 shown in FIG. 1 and output from the right ends of the first waveguide layer 31 and the second waveguide layer 32.

When light is incident at the input end of the first waveguide layer 31, part of the incident light is distributed to the second waveguide layer 32 in the optical coupling section 50. The light distributed in the optical coupling section 50 is emitted from the output ends of the waveguide layers 31 and 32.

In the directional coupler 100, the waveguide layers 31 and 32 function as cores and the cladding layers 21 and 22 and the separation layers 41 and 42 function as clads. In the directional coupler 100, no bonded interface is present in the optical path from the input ends to the output ends of the waveguide layers 31 and 32. Therefore, loss of light in each waveguide layer can be decreased even if the waveguide layers are disposed in the stacking direction.

The directional coupler 100 functions in the same manner if the light is incident at the input end of the second waveguide layer 32, or the output end and the input end are reversed.

3. Method of Manufacturing Device

An example of a method of manufacturing the directional coupler 100 according to the present embodiment is described below with reference to FIGS. 2A to 6C.

Figure 2A:
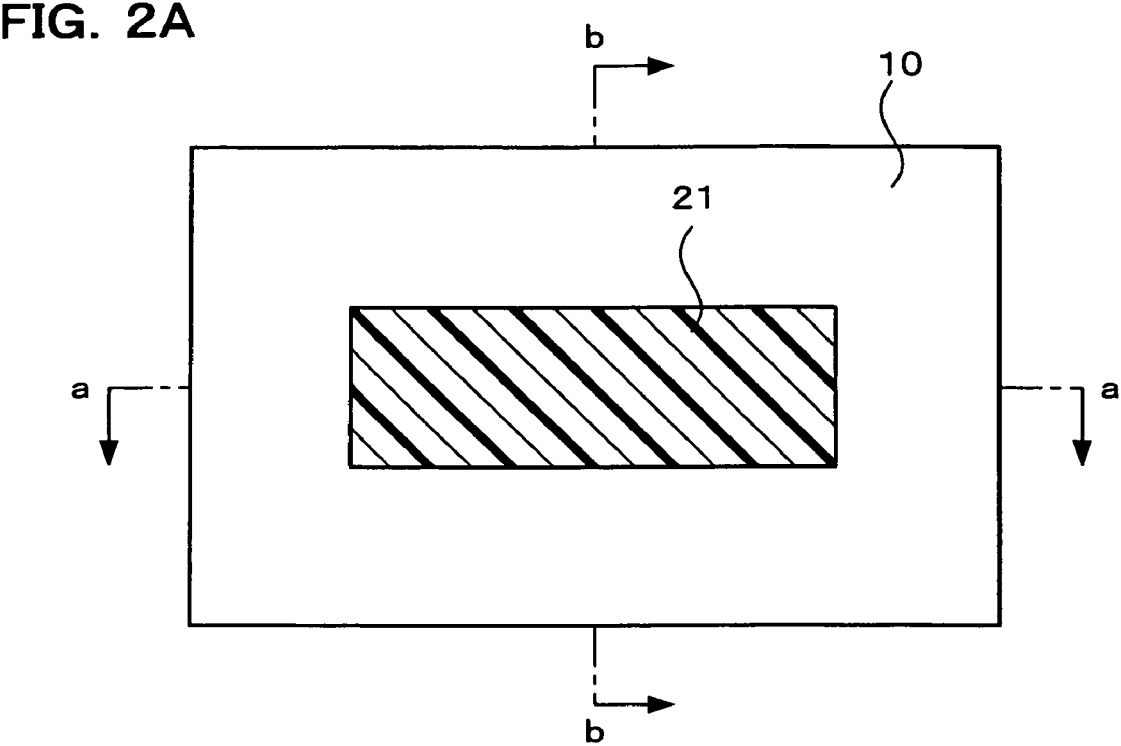
FIG. 2A is a plan view schematically showing a manufacturing step of the directional coupler shown in FIG. 1.
Figure 2B:
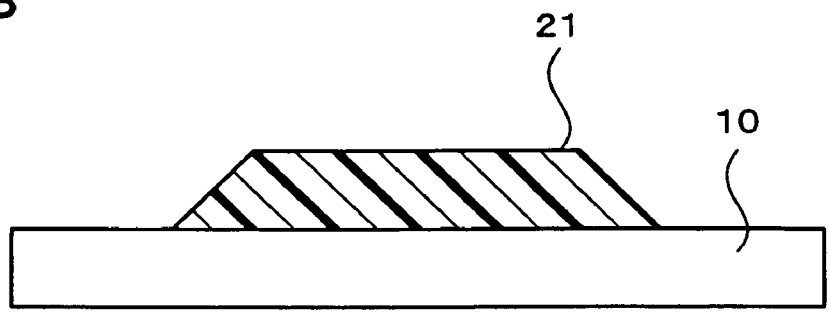
FIG. 2B shows a cross section along the line a-a shown in FIG. 2A.
Figure 2C:
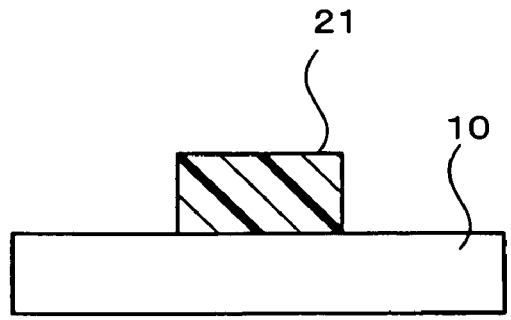
FIG. 2C shows a cross section along the line b-b shown in FIG. 2A.

As shown in FIGS. 2A to 2C, the first cladding layer 21 is formed over the substrate 10 by using an ink-jet method. As shown in FIG. 2B, the first cladding layer 21 is formed to have a portion which projects on the substrate 10 (projecting portion).

The following description is given on the assumption that the substrate 10 is formed of a material having the same refractive index as the first cladding layer 21. In the case where the refractive index of the substrate 10 differs from the refractive index of the first cladding layer 21, the first cladding layer 21 is also stacked in a region in which the first waveguide layer 31 is stacked. The shape of the first cladding layer 21 is not limited to that shown in FIGS. 2A to 2C insofar as the first cladding layer 21 is formed to become a base for providing a bent portion at least to the first waveguide layer 31. For example, the first cladding layer 21 may be stacked on the entire surface of the substrate 10 so that a predetermined region projects on the substrate 10.

Figure 3A:
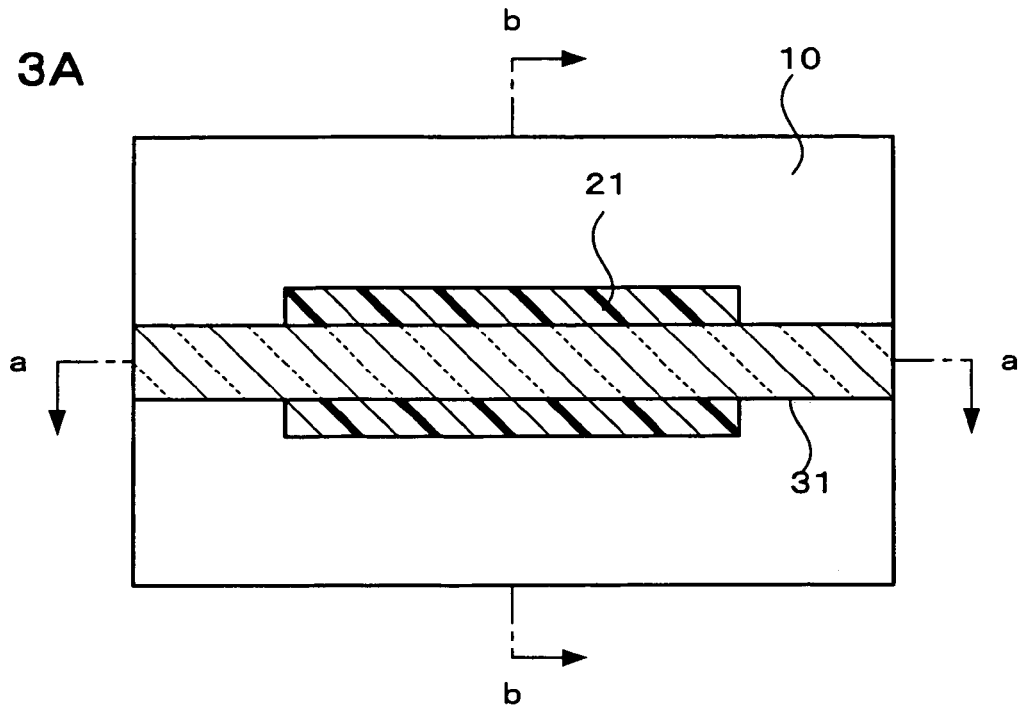
FIG. 3A is a plan view schematically showing another manufacturing step of the directional coupler shown in FIG. 1.
Figure 3B:
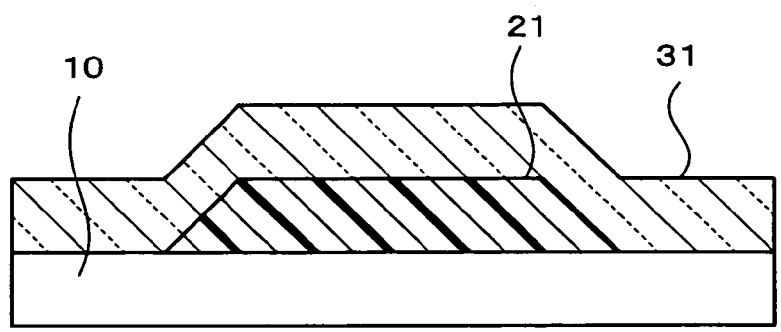
FIG. 3B shows a cross section along the line a-a shown in FIG. 3A.
Figure 3C:
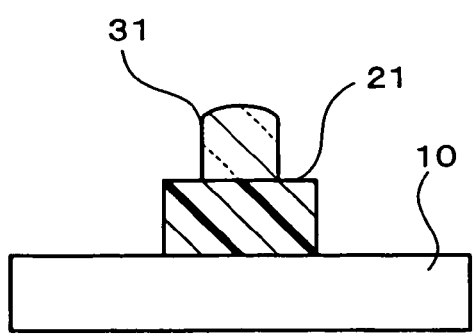
FIG. 3C shows a cross section along the line b-b shown in FIG. 3A.

As shown in FIGS. 3A to 3C, the first waveguide layer 31 is formed to have a bent portion on the first cladding layer 21 by using an ink-jet method. As shown in FIG. 3B, the first waveguide layer 31 is formed as an integral and continuous layer in which no bonded interface is present, although the first waveguide layer 31 has the bent portion.

Figure 4A:
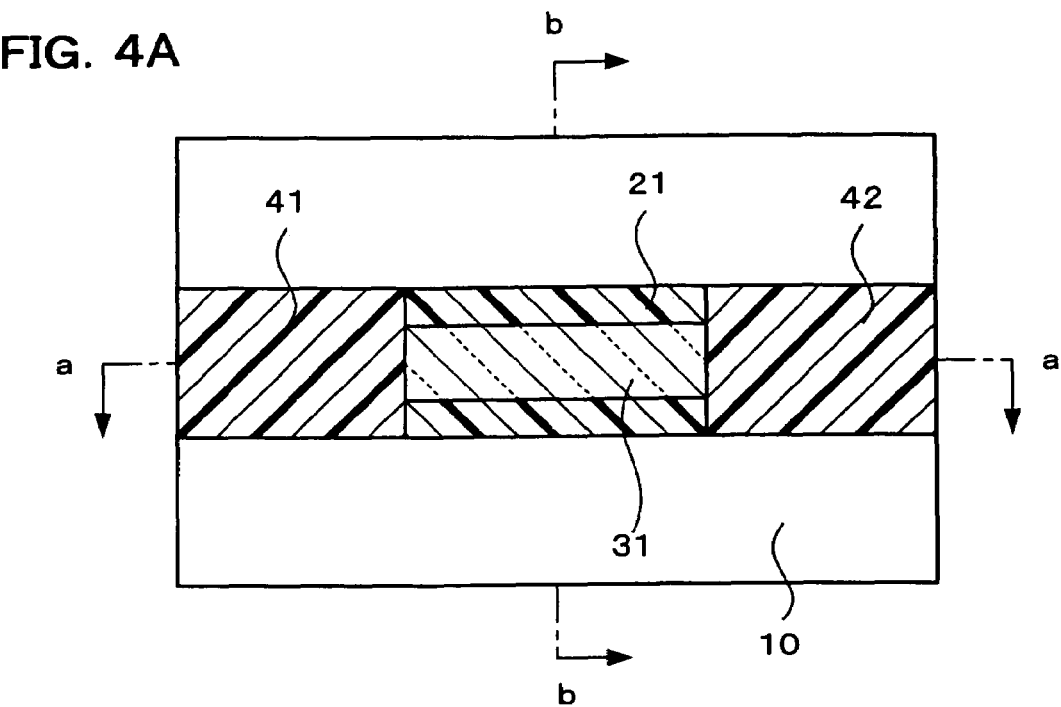
FIG. 4A is a plan view schematically showing another manufacturing step of the directional coupler shown in FIG. 1.
Figure 4B:
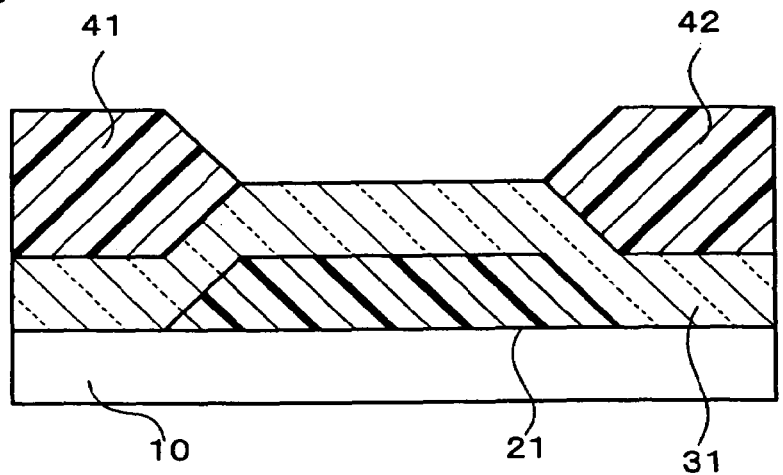
FIG. 4B shows a cross section along the line a-a shown in FIG. 4A.
Figure 4C:
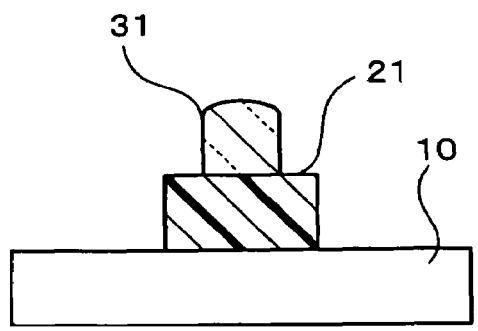
FIG. 4C shows a cross section along the line b-b shown in FIG. 4A.

As shown in FIGS. 4A to 4C, the first separation layer 41 and the second separation layer 42 are formed by using an ink-jet method. In the present embodiment, the separation layers 41 and 42 are stacked higher than a position at which the first waveguide layer 31 is in contact with the second waveguide layer 32, specifically, higher than the optical coupling section 50, in order to provide a bent portion to the second waveguide layer 32. The separation layers 41 and 42 may be deposited to cover the entire area of the first waveguide layer 31 and processed by etching or the like. In the present embodiment, the separation layers 41 and 42 are formed of a material having the same refractive index as the first cladding layer 21.

Figure 5A:
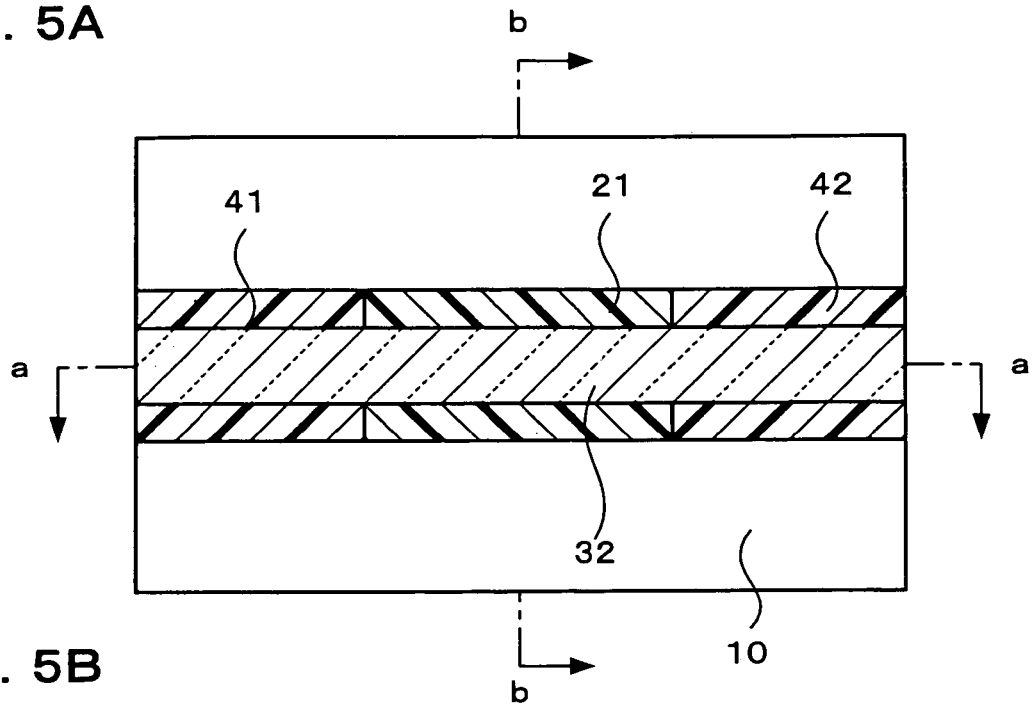
FIG. 5A is a plan view schematically showing another manufacturing step of the directional coupler shown in FIG. 1.
Figure 5B:
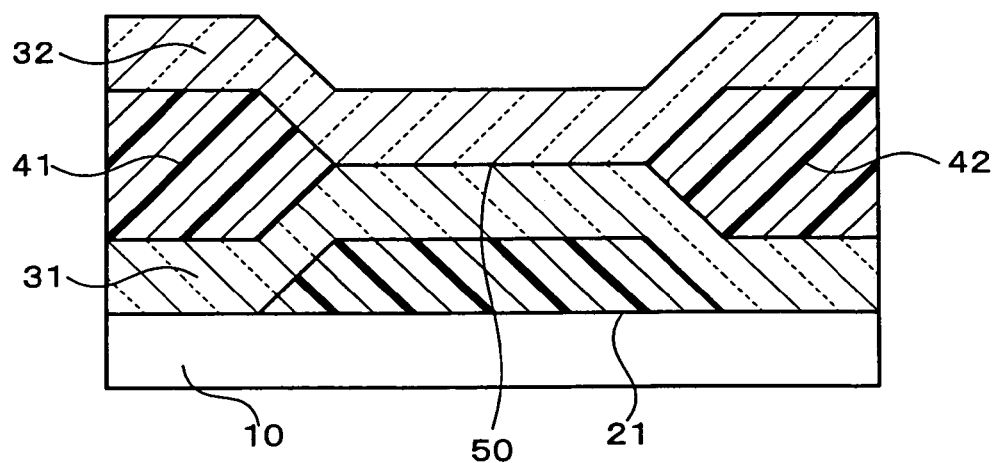
FIG. 5B shows a cross section along the line a-a shown in FIG. 5A.
Figure 5C:
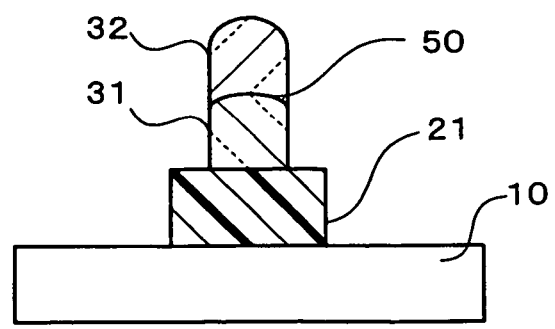
FIG. 5C shows a cross section along the line b-b shown in FIG. 5A.

As shown in FIGS. 5A to 5C, the second waveguide layer 32 is formed over the first waveguide layer 31 and the separation layers 41 and 42 by using an ink-jet method. As shown in FIG. 5B, the two ends of the first waveguide layer 31 and the second waveguide layer 32 are separated from each other by the separation layers 41 and 42, respectively. The first waveguide layer 31 and the second waveguide layer 32 are in contact in a predetermined region to form the optical coupling section 50 in this region. As a material for the second waveguide layer 32, a material having a refractive index the same as or differing from the first waveguide layer 31 may be selected depending upon the distribution of light in the optical coupling section 50.

Figure 6A:
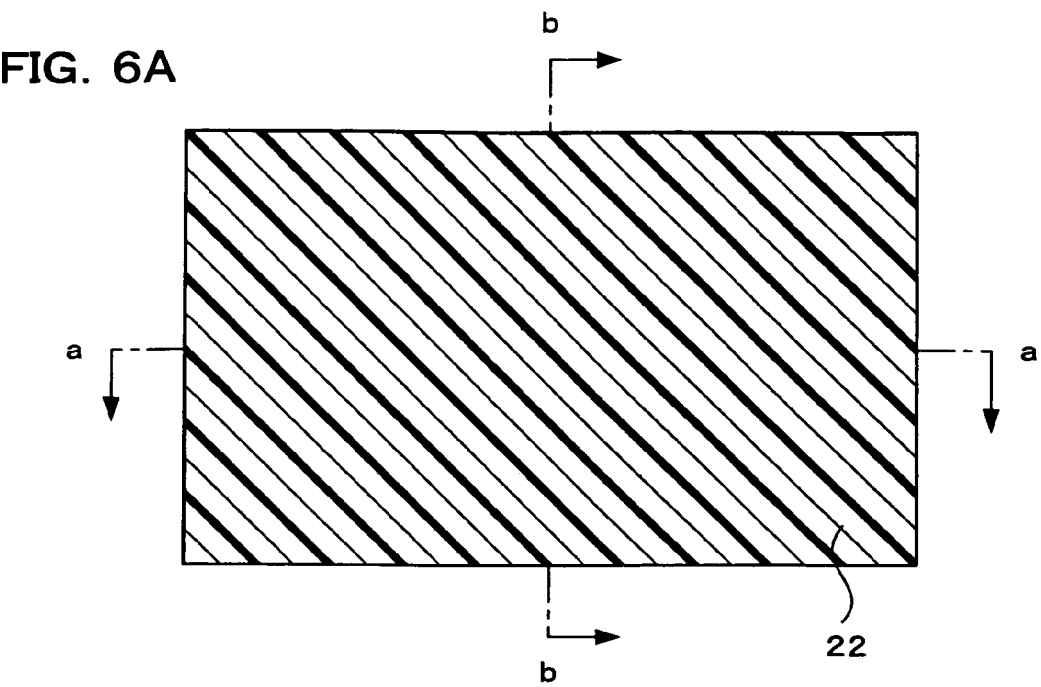
FIG. 6A is a plan view schematically showing another manufacturing step of the directional coupler shown in FIG. 1.
Figure 6B:
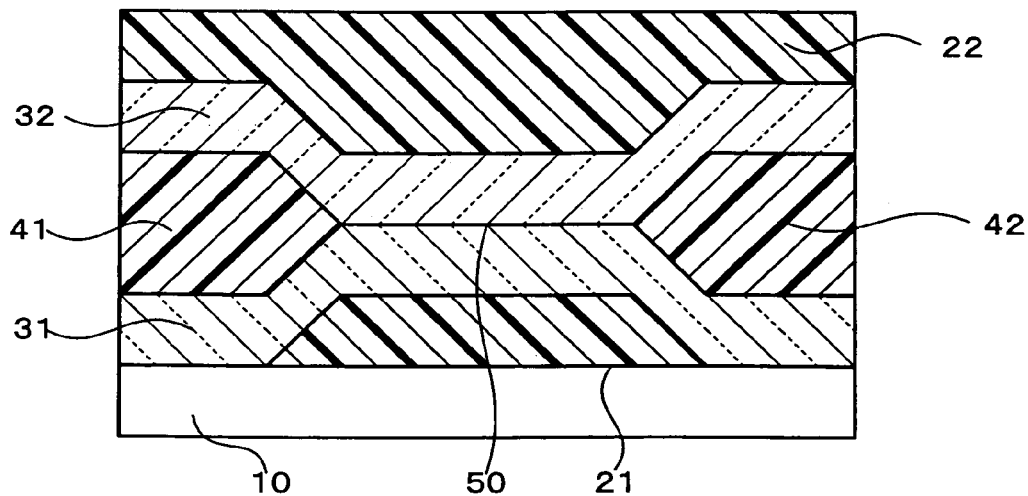
FIG. 6B shows a cross section along the line a-a shown in FIG. 6A.
Figure 6C:
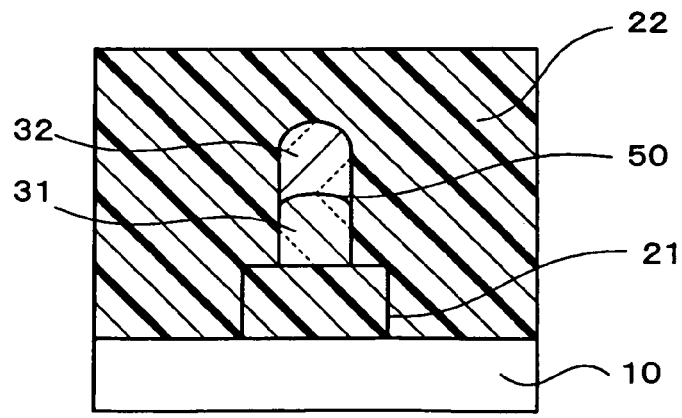
FIG. 6C shows a cross section along the line b-b shown in FIG. 6A.

As shown in FIGS. 6A to 6C, the second cladding layer 22 is formed by using a spin coating method. As shown in FIG. 6C, the second cladding layer 22 is formed to cover the waveguide layers 31 and 32 and functions as cladding together with the first cladding layer 21 and the separation layers 41 and 42. In the present embodiment, the second cladding layer 22 is formed of a material having the same refractive index as the first cladding layer 21 and the separation layers 41 and 42.

The above-described film formation methods and processing methods for each layer are only examples. The present embodiment is not limited to these methods.

4. Modifications

Figure 7A:
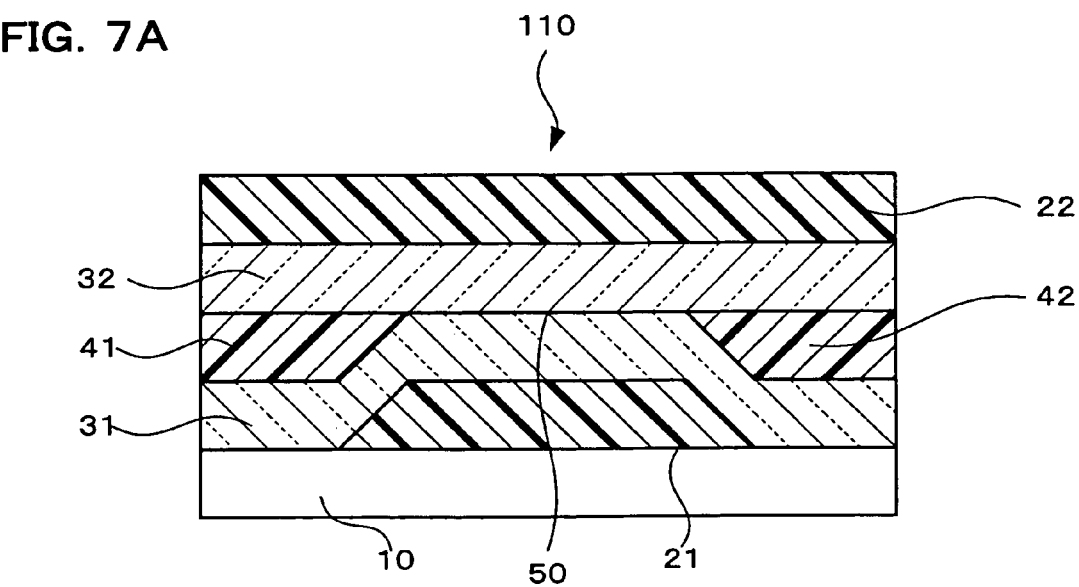
FIG. 7A is a cross-sectional view schematically showing a modification 1 of the directional coupler according to the first embodiment.

Modification 1:

FIG. 7A is a cross-sectional view schematically showing a directional coupler 110 according to a modification 1 of the first embodiment. Sections having substantially the same functions as the sections shown in FIG. 1 are indicated by the same reference numerals. Detailed description of these sections is omitted. The directional coupler 110 of the modification 1 is manufactured by the same method as the directional coupler 100 shown in FIG. 1 and has the same functions as the directional coupler 100.

In the directional coupler 110, the second waveguide layer 32 is formed linearly and only the first waveguide layer 31 has a bent portion. The directional coupler 110 is capable of achieving the same effects as in the first embodiment. According to the structure of the directional coupler 110, the step of forming the waveguide layer can be simplified, whereby the number of manufacturing steps can be decreased.

Figure 7B:
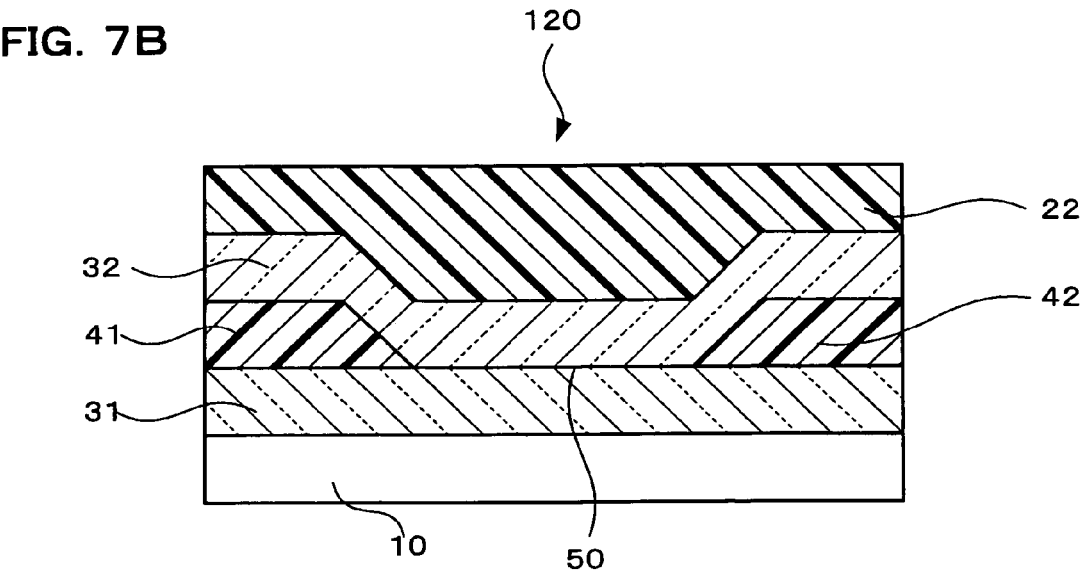
FIG. 7B is a cross-sectional view schematically showing a modification 2 of the directional coupler according to the first embodiment.

Modification 2:

FIG. 7B is a cross-sectional view schematically showing a directional coupler 120 according to a modification 2 of the first embodiment. Sections having substantially the same function as the sections shown in FIG. 1 are indicated by the same reference numerals. Detailed description of these sections is omitted. The directional coupler 120 of the modification 2 is manufactured by the same method as the directional coupler 100 shown in FIG. 1 and has the same functions as the directional coupler 100.

In the directional coupler 120, the first waveguide layer 31 is formed linearly and only the second waveguide layer 32 has a bent portion. The directional coupler 120 is capable of achieving the same effects as in the modification 1. According to the structure of the directional coupler 120, since it is unnecessary to form the first cladding layer 21, the number of manufacturing steps can be further decreased.

Second Embodiment

Figure 8:
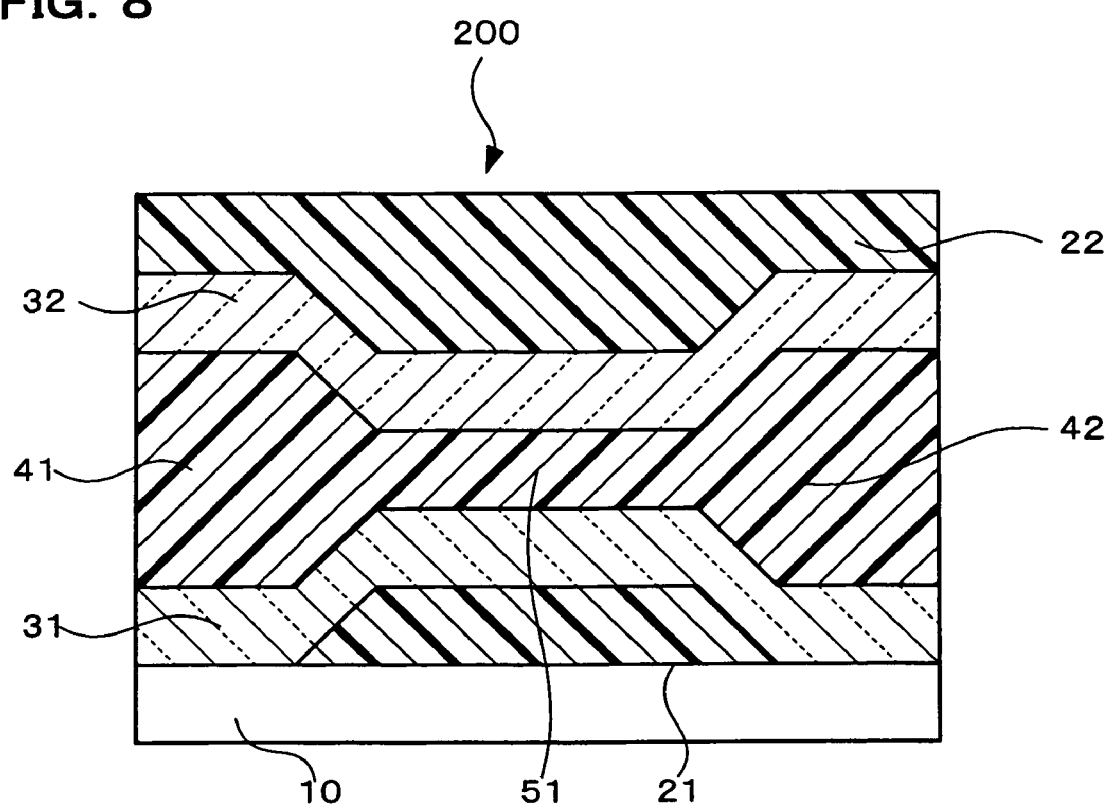
FIG. 8 is a cross-sectional view schematically showing a directional coupler according to a second embodiment of the present invention.

FIG. 8 is a cross-sectional view schematically showing a directional coupler 200 according to a second embodiment of the present invention. Sections having substantially the same functions as the sections shown in FIG. 1 are indicated by the same reference numerals. Detailed description of these sections is omitted. In the directional coupler 200, the first separation layer 41 is integrally and continuously formed with the second separation layer 42. An area in which the separation layers 41 and 42 are connected is disposed between the first waveguide layer 31 and the second waveguide layer 32 to form an optical coupling section 51. The directional coupler 200 is manufactured by the same method as the directional coupler 100 shown in FIG. 1 and has the same functions as the directional coupler 100.

Therefore, the directional coupler 200 is capable of achieving the same effects as the directional coupler 100 according to the first embodiment of the present invention. According to the directional coupler 200, since the distance between the waveguide layers can be changed by changing the thickness of the connection area between the separation layers 41 and 42, a directional coupler having a desired distribution in the optical coupling section 51 can be easily realized. The distribution in the optical coupling section 51 can be easily changed by forming the separation layers and the cladding layers by using materials having different refractive indices.

Figure 9A:
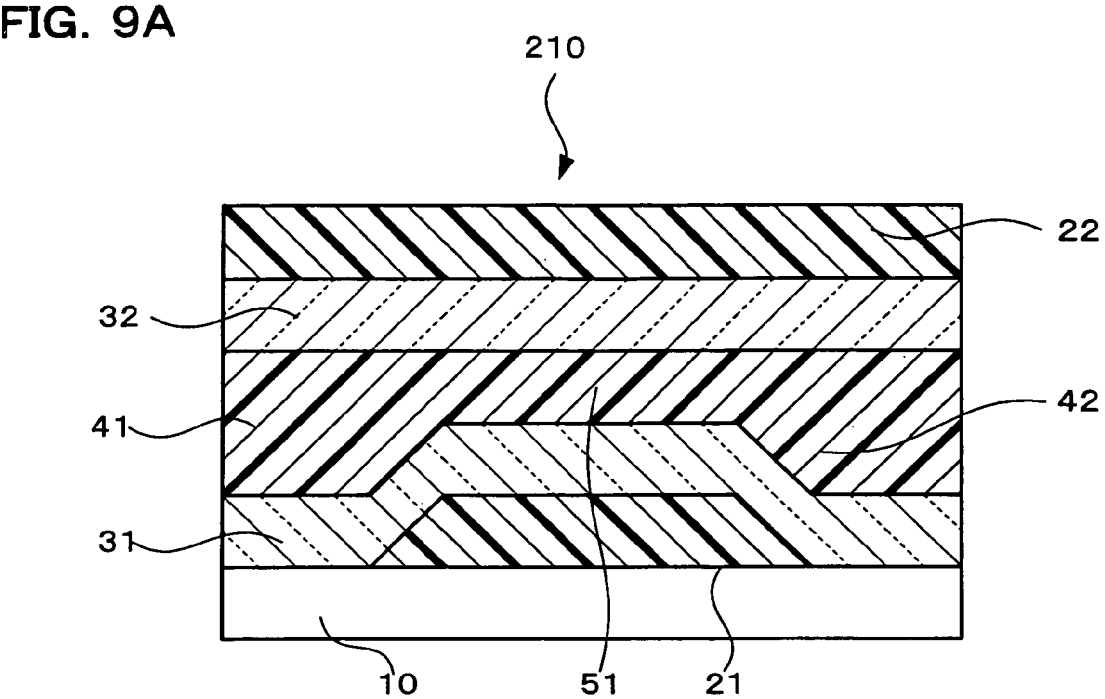
FIG. 9A is a cross-sectional view schematically showing a modification 1 of the directional coupler according to the second embodiment.

Modification 1:

FIG. 9A is a cross-sectional view schematically showing a directional coupler 210 according to a modification 1 of the second embodiment. Sections having substantially the same function as the sections shown in FIG. 1 are indicated by the same reference numerals. Detailed description of these sections is omitted. The directional coupler 210 of the modification 1 is manufactured by the same method as the directional coupler 100 shown in FIG. 1 and has the same functions as the directional coupler 100.

In the directional coupler 210, the second waveguide layer 32 is formed linearly and only the first waveguide layer 31 has a bent portion. The directional coupler 210 is capable of achieving the same effects as in the second embodiment. According to the structure of the directional coupler 210, the step of forming the waveguide layer can be simplified, whereby the number of manufacturing steps can be decreased.

Figure 9B:
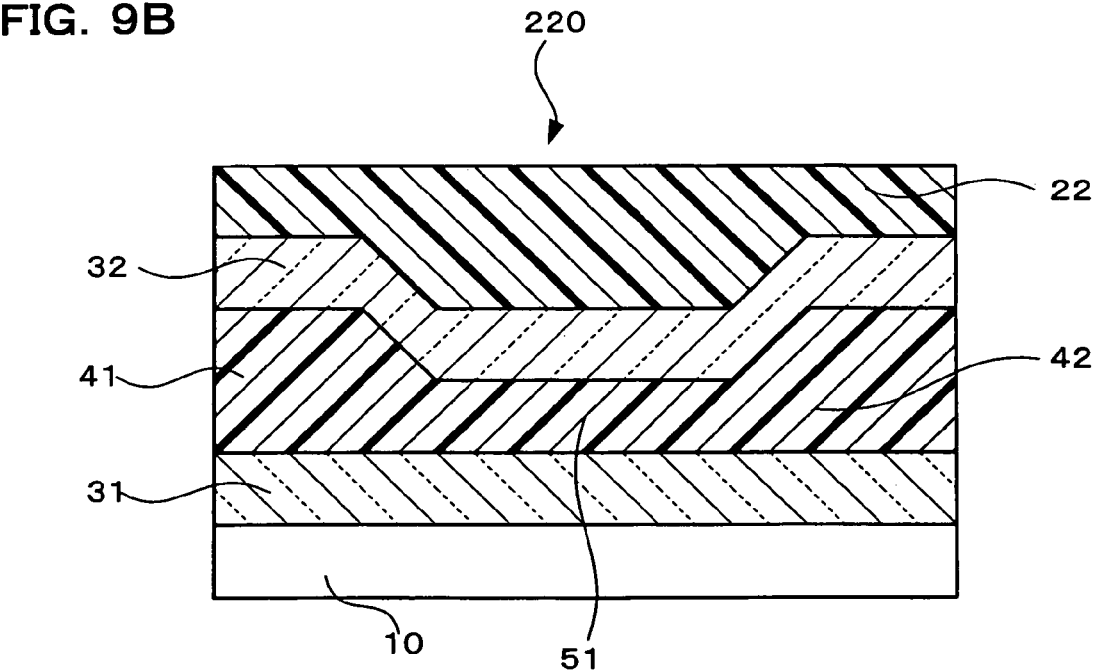
FIG. 9B is a cross-sectional view schematically showing a modification 2 of the directional coupler according to the second embodiment.

Modification 2:

FIG. 9B is a cross-sectional view schematically showing a directional coupler 220 according to a modification 2 of the second embodiment. Sections having substantially the same function as the sections shown in FIG. 1 are indicated by the same reference numerals. Detailed description of these sections is omitted. The directional coupler 220 of the modification 2 is manufactured by the same method as the directional coupler 100 shown in FIG. 1 and has the same functions as the directional coupler 100.

In the directional coupler 220, the first waveguide layer 31 is formed linearly and only the second waveguide layer 32 has a bent portion. The directional coupler 220 is capable of achieving the same effects as in the modification 1. According to the structure of the directional coupler 220, since it is unnecessary to form the first cladding layer 21, the number of manufacturing steps can be further decreased.

Third Embodiment

Figure 10A:
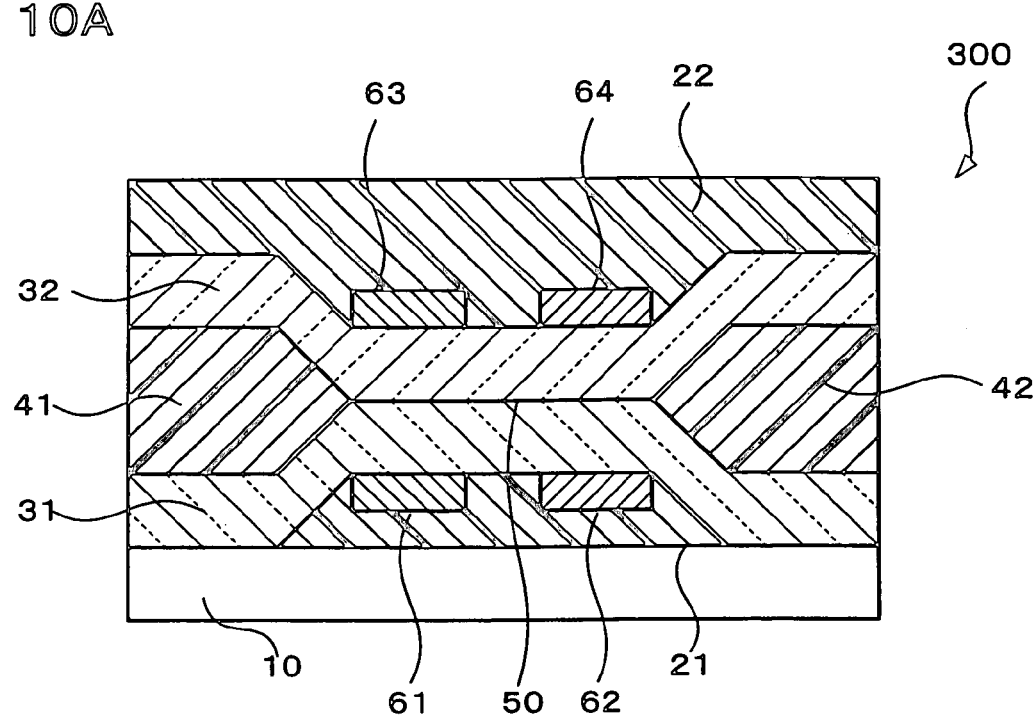
FIG. 10A is a cross-sectional view schematically showing a directional coupler according to a third embodiment.

FIG. 10A is a cross-sectional view schematically showing a directional coupler 300 according to a third embodiment of the present invention. Sections having substantially the same function as the sections shown in FIG. 1 are indicated by the same reference numerals. Detailed description of these sections is omitted. The cladding layers 21 and 22, the waveguide layers 31 and 32, and the separation layers 41 and 42 of the directional coupler 300 are formed by the same method as for the directional coupler 100 shown in FIG. 1 and have the same basic functions as in the directional coupler 100.

In the directional coupler 300, first electrode layers 61 and 62 are disposed under the first waveguide layer 31 in the optical coupling section 50, and second electrode layers 63 and 64 are disposed over the second waveguide layer 32 in the optical coupling section 50.

Figure 10B:
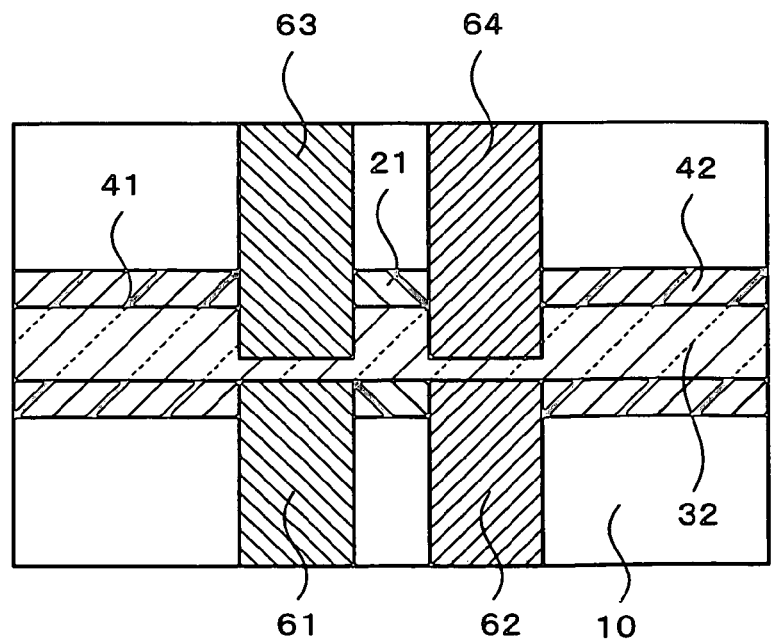
FIG. 10B is a plan view schematically showing a manufacturing step of the directional coupler according to the third embodiment.

As shown in FIG. 10A, the first electrode layers 61 and 62 are formed to be disposed under the first waveguide layer 31 when forming the first cladding layer 21. The second electrode layers 63 and 64 are formed to be disposed over the second waveguide layer 32. FIG. 10B shows a state before the step of forming the second cladding layer 22.

In the directional coupler 300, the first electrode layer 61 and the second electrode layer 63 form a first electrode pair, and the first electrode layer 62 and the second electrode layer 64 form a second electrode pair.

In the directional coupler 300, the distribution of light in the optical coupling section 50 can be controlled by applying a higher voltage to the first electrode layer 61 of the first electrode pair than to the second electrode layer 63 and applying a higher voltage to the second electrode layer 64 of the second electrode pair than to the first electrode layer 62.

Therefore, the directional coupler 300 may be applied to an optical switching element or an optical modulator which utilizes an electro-optic effect produced in the optical coupling section 50 by the voltages applied to the electrode layers 61 to 64. The difference in the refractive index between the waveguides 31 and 32 in the optical coupling section 50 or the phase difference of light passing through the optical coupling section 50 is changed by the electro-optic effect.

In the present embodiment, the configuration in which the distribution in the optical coupling section 50 is controlled by providing a plurality of electrode pairs is employed. However, the present embodiment is not limited to this configuration. For example, it suffices that at least one electrode pair be provided. The configuration of the present embodiment in which the electrode pair is provided may be applied not only to the directional coupler shown in FIG. 1 but also to the directional couplers shown in FIGS. 7 to 9.

Fourth Embodiment

Figure 11A:
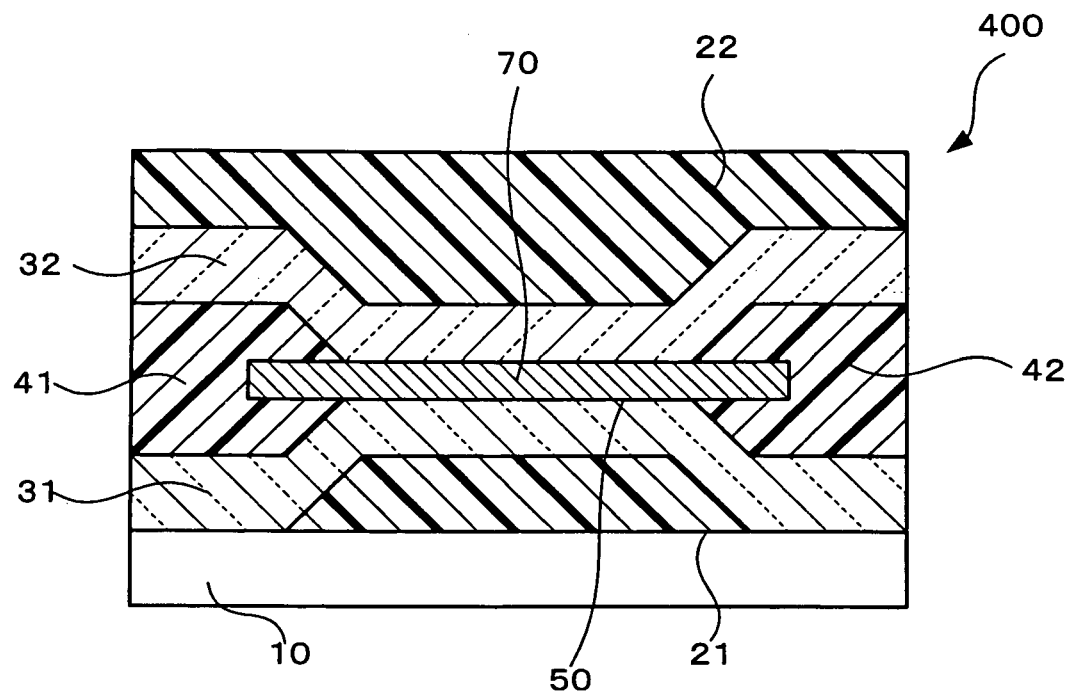
FIG. 11A is a cross-sectional view schematically showing a directional coupler according to a fourth embodiment.

FIG. 11A is a cross-sectional view schematically showing a directional coupler 400 according to a fourth embodiment of the present invention. Sections having substantially the same functions as the sections shown in FIG. 1 are indicated by the same reference numerals. Detailed description of these sections is omitted. The cladding layers 21 and 22, the waveguide layers 31 and 32, and the separation layers 41 and 42 of the directional coupler 400 are formed by the same method as for the directional coupler 100 shown in FIG. 1 and have the same basic functions as in the directional coupler 100.

In the directional coupler 400, a heating section 70 is formed around the optical coupling section 50. The heating section 70 is capable of causing the distribution of light in the optical coupling section 50 to be changed by heating the optical coupling section 50.

Figure 11B:
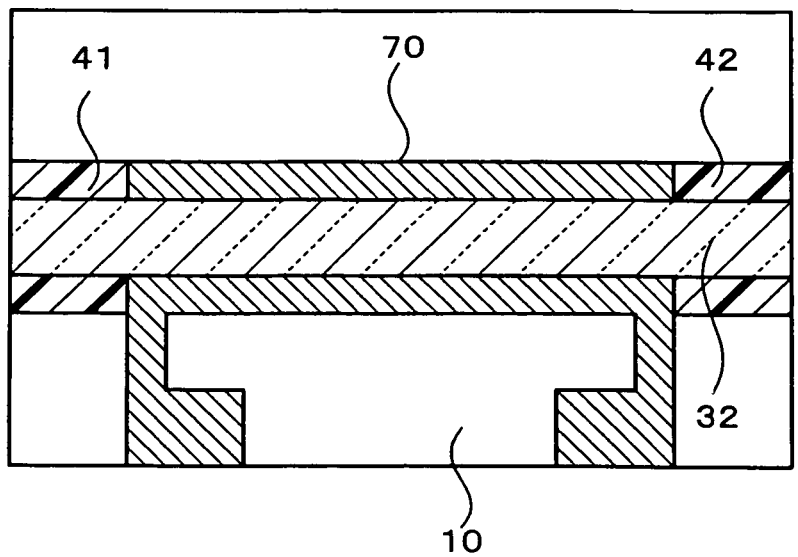
FIG. 11B is a plan view schematically showing a manufacturing step of the directional coupler according to the fourth embodiment.

As shown in FIG. 11A, the heating section 70 is formed to be disposed around the optical coupling section 50 by using a metal having high resistivity when forming the separation layers 41 and 42, for example. FIG. 11B shows a state before the step of forming the second cladding layer 22.

In the directional coupler 400, the optical coupling section 50 is heated by utilizing heat generated by current flowing through the heating section 70. A thermo-optic effect occurs in the optical coupling section 50 by the change in temperature in the surroundings, whereby the difference in the refractive index between the waveguides 31 and 32 is changed. Specifically, the directional coupler 400 is capable of controlling the distribution of light.

Therefore, the directional coupler 400 may be applied to an optical switching element or an optical modulator which utilizes the thermo-optic effect in the optical coupling section 50.

In the present embodiment, the configuration in which the optical coupling section 50 is heated by utilizing heat produced by current flowing through the metal is employed. However, the present embodiment is not limited to this configuration. For example, the heating section 70 capable of changing the temperature by the Peltier effect by combining a semiconductor with a metal may be formed. The shape of the heating section 70 is not limited to that shown in FIG. 11A. Various types of shape suitable for changing the temperature of the optical coupling section 50 may be employed. The configuration of the present embodiment in which the heating section 70 is provided may be applied not only to the directional coupler shown in FIG. 1 but also to the directional couplers shown in FIGS. 7 to 10.

Fifth Embodiment

Figure 12:
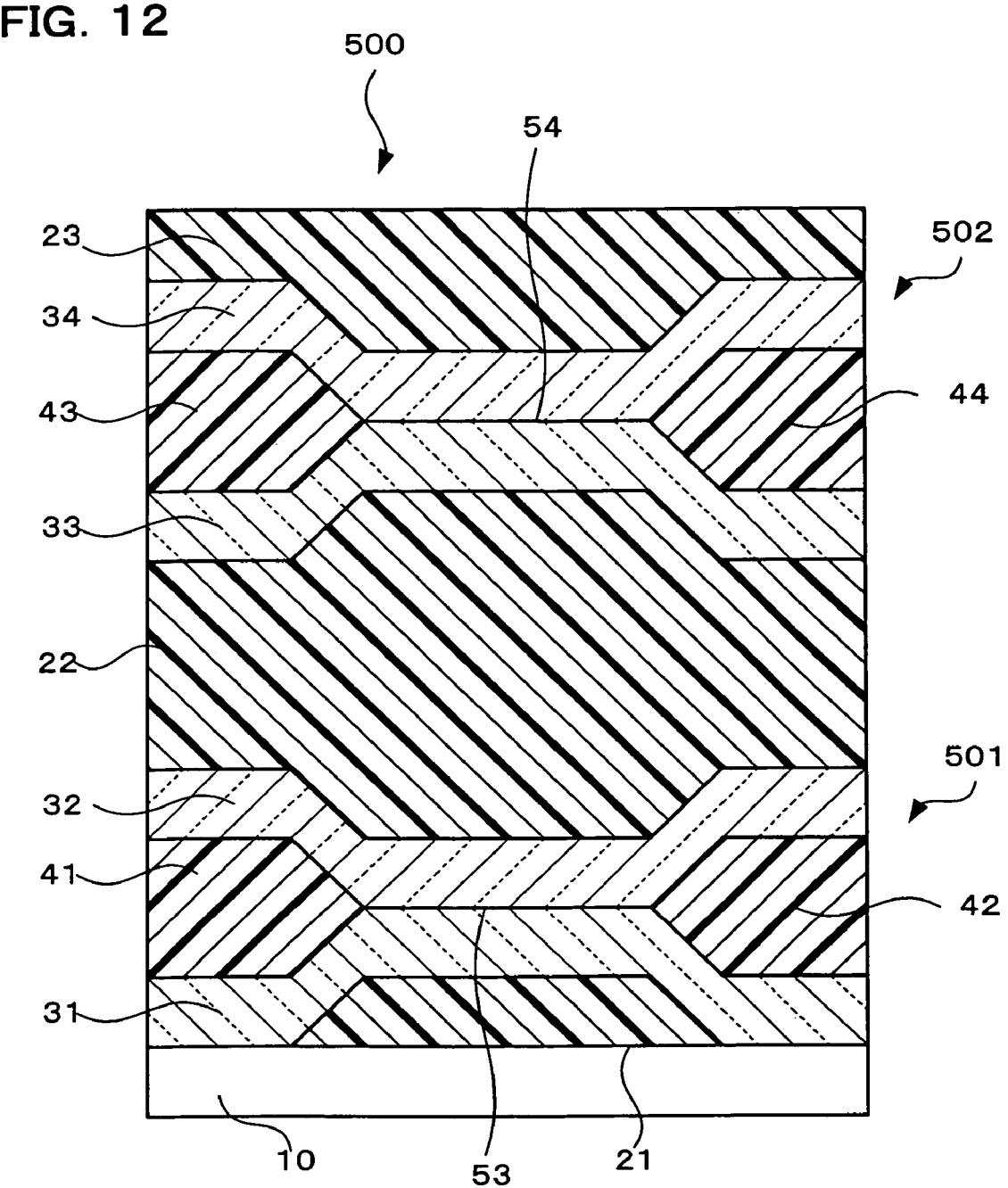
FIG. 12 is a cross-sectional view schematically showing a directional coupler according to a fifth embodiment of the present invention.

FIG. 12 is a cross-sectional view schematically showing a directional coupler 500 according to a fifth embodiment of the present invention. Sections having substantially the same functions as the sections shown in FIG. 1 are indicated by the same reference numerals. Detailed description of these sections is omitted. The directional coupler 500 is manufactured by the same method as the directional coupler 100 shown in FIG. 1 and has the same functions as the directional coupler 100.

In the directional coupler 500, two directional couplers 501 and 502, each having the same functions as the directional coupler 100 according to the first embodiment, are integrated in the stacking direction.

In the directional coupler 501, the first cladding layer 21, the first waveguide layer 31, the second waveguide layer 32, the first separation layer 41, the second separation layer 42, and the second cladding layer 22 are stacked on the substrate 10. An optical coupling section 53 is formed in the contact area between the waveguide layers 31 and 32.

The second cladding layer 22 is formed to have a portion which projects on the substrate 10 as the first cladding layer 21.

In the directional coupler 502, a third waveguide layer 33, a fourth waveguide layer 34, a third separation layer 43, a fourth separation layer 44, and a third cladding layer 23 are stacked on the second cladding layer 22. An optical coupling section 54 is formed in the contact area between the waveguide layers 33 and 34.

Specifically, in the directional couplers 501 and 502, light is distributed from one waveguide layer to the other waveguide layer in the optical coupling sections 53 and 54. In the directional coupler 500, the second cladding layer 22 may be thickly stacked in order to prevent interference of light between the directional coupler 501 and the directional coupler 502.

The directional coupler 500 is not limited to the configuration shown in FIG. 12. Three or more directional couplers may be stacked. As the directional couplers to be stacked, the directional couplers shown in FIG. 1 and FIGS. 7 to 11 may be used in combination, if necessary.

According to the configuration of the directional coupler 500 of the present embodiment, the same effects as in the above-described embodiments can be achieved. Moreover, since a plurality of directional couplers can be stacked, directional couplers having different distributions and directional couplers capable of changing the distribution can be easily integrated in the stacking direction.

The embodiments of the present invention are described above. However, the present invention is not limited to these embodiments. Various modifications and variations are possible within the scope of the present invention.

What is claimed is:

1. A method of manufacturing a directional coupler that includes a cladding material, a first waveguide layer, and a second waveguide layer, a part of the first waveguide layer and a part of the second waveguide layer overlapping each other to form an optical coupling section, and a separation material separating the first waveguide layer and the second waveguide layer at least at one end of the first waveguide layer and the second waveguide layer, the method comprising:

forming the cladding material on a substrate by an ink-jet method;

forming the first waveguide layer on the cladding material by an ink-jet method;

forming the separation material on the first waveguide layer by an ink-jet method; and forming the second waveguide layer on the separation material and the part of the first waveguide layer by an ink-jet method, a width of the first waveguide layer and the second waveguide layer being configured to be narrower than a width of the substrate.

2. The method of manufacturing a directional coupler according to claim 1, the forming of the cladding material including forming the cladding material so as to have a bent portion.

3. The method of manufacturing a directional coupler according to claim 1, the forming of the cladding material including forming the cladding material more narrowly than the substrate.

4. The method of manufacturing a directional coupler according to claim 1, the forming of the first waveguide layer including forming the first waveguide layer so as to have a bent portion.

5. The method of manufacturing a directional coupler according to claim 1, the forming of the second waveguide layer including forming the second waveguide layer so as to have a bent portion.

6. The method of manufacturing a directional coupler according to claim 1, the forming of the first waveguide layer and the second waveguide layer including forming the first waveguide layer and the second waveguide layer in a shape of a line.

7. The method of manufacturing a directional coupler according to claim 1, further comprising: forming a first electrode on the first cladding material corresponding to the optical coupling section and forming a second electrode on the second waveguide layer corresponding to the optical coupling section.

8. The method of manufacturing a directional coupler according to claim 1, further comprising: forming a heating section corresponding to the optical coupling section.

9. The method of manufacturing a directional coupler according to claim 1, the cladding material and the separation material having the same refractive index.

10. The method of manufacturing a directional coupler according to claim 1, the cladding material and the separation material having different refractive indices.

11. The method of manufacturing a directional coupler according to claim 1, the first waveguide layer and the second waveguide layer having the same refractive index.

12. The method of manufacturing a directional coupler according to claim 1, the first waveguide layer and the second waveguide layer having different refractive indices.

13. A method of manufacturing a directional coupler that includes a first waveguide layer, a second waveguide layer, a first separation material, a second separation material, a third separation material, and a cladding material, the method comprising:

disposing the second separation material between the first separation material and the third separation material;

integrally forming the first separation material, the second separation material and the third separation material between the first waveguide layer and the second waveguide layer, forming an optical coupling section by the first waveguide layer, the second separation material and the second waveguide layer;

forming the first waveguide layer on a substrate;

forming the first separation material, the second separation material and the third separation material on the first waveguide layer by an ink-jet method;

forming the second waveguide layer on the first separation material, on the second separation material, and on the third separation material by an ink-jet method, a width of the first waveguide layer and the second waveguide layer being configured to be narrower than a width of the substrate; and forming the cladding material on the second waveguide layer by an ink-jet method.

14. The method of manufacturing a directional coupler according to claim 13, the forming of the first separation material including forming the first separation material so as to have a bent portion.

15. The method of manufacturing a directional coupler according to claim 13, the forming of the third separation material including forming the third separation material so as to have a bent portion.

16. The method of manufacturing a directional coupler according to claim 14, the forming of the first separation material including forming the first separation material thicker than the optical coupling section.

17. The method of manufacturing a directional coupler according to claim 15, the forming of the third separation material including forming the third separation material thicker than the optical coupling section.

18. The method of manufacturing a directional coupler according to claim 13, the forming of the second waveguide layer including forming the second waveguide layer so as to have a bent portion.

* * * * *